Aug. 6, 1968

W. B. KINDRED 3,395,861

SLOT CAR TRACK

Filed Aug. 18, 1966

INVENTOR.
William B. Kindred
BY
Barnard, McGlynn & Leising
ATTORNEYS

United States Patent Office 3,395,861
Patented Aug. 6, 1968

3,395,861
SLOT CAR TRACK
William B. Kindred, 14659 Horger St.,
Allen Park, Mich. 48101
Filed Aug. 18, 1966, Ser. No. 573,343
16 Claims. (Cl. 238—10)

ABSTRACT OF THE DISCLOSURE

An improved slot car track assembly and, more specifically, such an assembly including a plurality of track sections abutting one another in end-to-end relationship and a plurality of support sections abutting one another in end-to-end relationship with the track sections being disposed in engagement with the support sections thereby providing a track of unique and sturdy construction.

---

Figure 1:
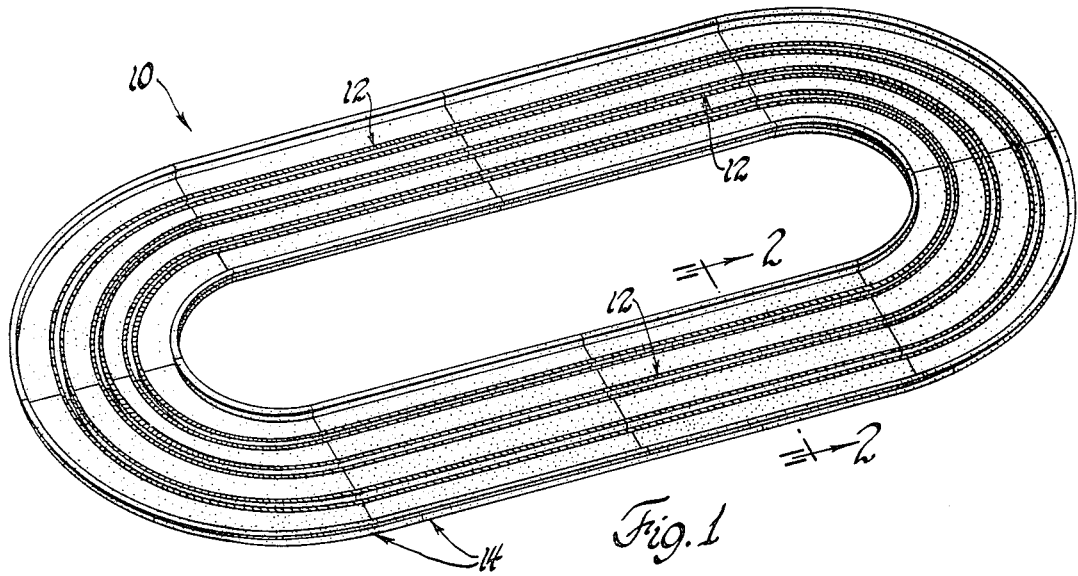

The hobby of slot car racing involves the moving of an electrically powered miniature vehicle about a slot car track. More specifically, the track has a plurality of slots, i.e., grooves, for guiding the respective slot cars and a conductor tape is secured to the track along each of the grooves for electrical contact with an electrical conductor or pick-up disposed below the slot car for conducting electrical power to the electric motor of the slot car.

Track assemblies of the type heretofore utilized are frequently made of wood, masonite or the like and are constructed at the site where they are to be used. Some track assemblies may be assembled and usually include sections joined with one another by tongue and groove connections. Normally, at least portions of the track are inclined at an angle relative to the horizontal to bank the track. To accomplish such an incline special structure is normally provided for supporting the track. Due to the construction of prior tracks, the rigidity and strength of such tracks are provided by the support structure.

The tracks of the type which have heretofore been utilized, therefore, are quite permanent and require a great deal of especially fabricated support structure. Furthermore, those tracks which have sections joined together by tongue and groove arrangements are susceptible to misalignment.

In addition to the structural problems accompanying the prior art track assemblies, it often occurs that the conductor tape disposed on the track along each side of the slots pulls itself away from the track on the curved portions when the temperature is such that the tape contracts. That is to say, a conductor tape disposed along a slot about a curved portion of the track is usually adhesively secured to the track, and when the temperature is such that the tape contracts, the tape pulls itself away from the track.

Accordingly, it is an object and feature of the instant invention to provide a slot car track assembly which may be readily assembled and is of itself sufficiently rigid that special support structure is not necessary.

Another object and feature of the instant invention is to provide a slot car track assembly which may be supported on an ordinary plane surface without necessitating especially fabricated support structure.

A further object and feature of this invention is to provide an improved conductor tape disposed on a slot car track so that the tape is allowed to expand and contract without pulling itself away from the track.

In general, these and other objects and features of this invention may be attained in a preferred embodiment including a plurality of track sections abutting one another in end-to-end relationship and a plurality of support sections abutting one another in end-to-end relationship with the track sections being supported by the support sections. Each track section has a cross section including an integral rail extending upwardly from each side and a plurality of spaced integral U-shaped portions forming a plurality of tracks which extend parallel to the rails. A recess extends along each side of each U-shaped portion and a corrugated conductor tape is disposed in the recess and is secured at spaced points therealong to the track section in a manner that the tape is allowed to expand and contract. Each of the support sections has a cross section including a straight portion engaging the lower extremity of the U-shaped portions and an inclined portion extending from each side of the straight portion to an integral side portion which is in coextensive engaging relationship with the adjacent side rail. The support sections also include a plurality of supports formed integrally therewith and disposed at spaced intervals along the track. Each of the supports includes a pair of surfaces meeting at an apex which is spaced from the straight portion of each support section. Each of these surfaces is disposed at an angle with the straight portion and is in a plane containing one of the inclined surfaces. There is included a plurality of walls integral with and interconnecting the pair of surfaces and the straight portion. Each support section, therefore, may be supported upon a planar structure by placing one of the pair of surfaces in engagement with the planar structure; hence, each track section is supported so that the track is inclined or banked relative to the planar structure. In addition, the abutting ends between the track sections are preferably spaced from the abutting ends of the support sections.

Figure 2:
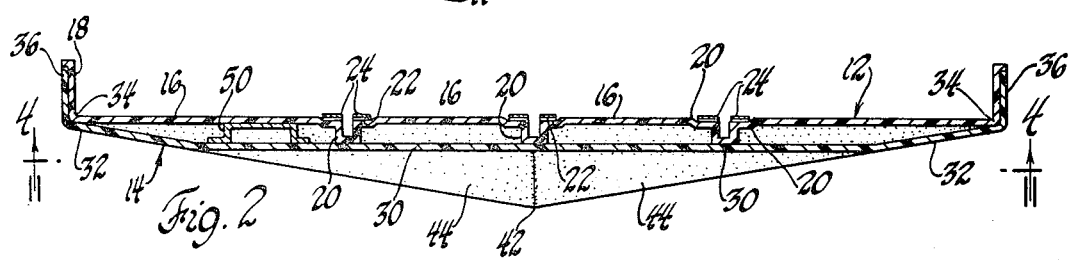
Figure 3:
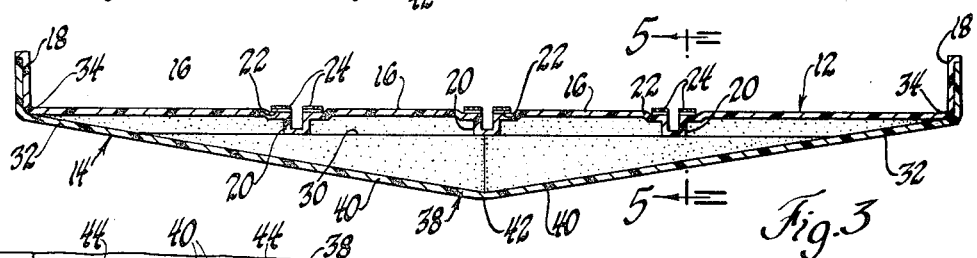
Figure 4:
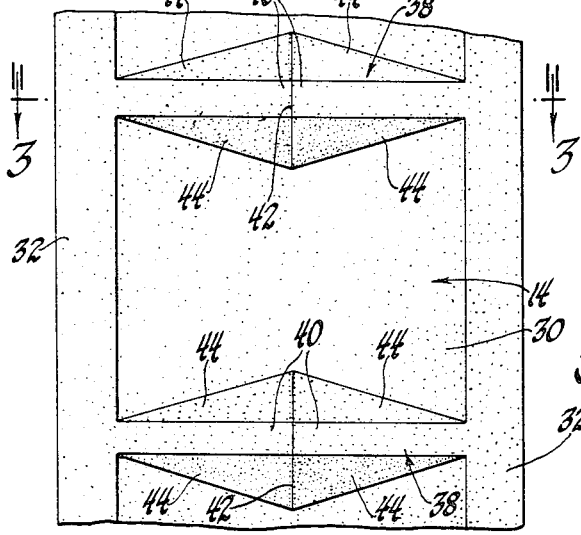
Figure 5:
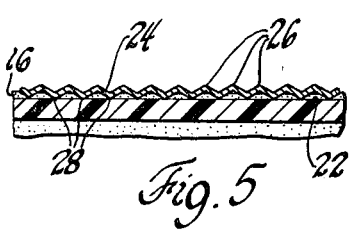

Other objects and attendant advantages of the present invention will be readily appreciated as the same becomes better understood by reference to the following detailed description when considered in connection with the accompanying drawings wherein:

FIGURE 1 is a perspective view of a preferred embodiment of the instant invention;
FIGURE 2 is an enlarged cross sectional view taken substantially along line 2—2 of FIGURE 1;
FIGURE 3 is an enlarged cross sectional view taken substantially along line 3—3 of FIGURE 4;
FIGURE 4 is a view in reduced scale taken substantially along line 4—4 of FIGURE 2; and
FIGURE 5 is an enlarged cross sectional view taken substantially along line 5—5 of FIGURE 3.

Referring now to the drawings wherein like numerals indicate like or corresponding parts throughout the several views, an improved slot car track assembly constructed in accordance with the instant invention is generally shown at 10 in FIGURE 1. The slot car track assembly includes a plurality of track sections, each of which is generally indicated at 12, and a plurality of support sections, each of which is generally indicated at 14.

The track sections 12 abut one another in end-to-end relationship and are molded of an organic polymeric material, preferably polystyrene. Each track section 12 has a cross section including a substantially planar wall portion 16 and an integral rail 18 extends upwardly from each side of the planar portion 16. A plurality of spaced integral U-shaped portions 20 extend downwardly from the planar portion 16 to form a plurality of tracks or slots which extend parallel to the rails 18. The planar portion 16 also includes a recess 22 therein which is disposed along each side of each U-shaped portion 20. In other words, the U-shaped portions 20 extend downwardly from the planar wall portion 16 and the bottoms of the U-shaped portions engage the straight portions 30 of the support sections 15.

A corrugated conductor tape 24 is disposed in each of the recesses 22 adjacent each side of the respective U-shaped portions 20. The corrugated tape 24 provides successive corrugations 26 along the track and is secured to the track sections 12 at spaced points 28 so that the tape is allowed to expand and contract between the spaced points 28. That is, the corrugated conductor tape 24 is disposed on the surface of the recess 22 in parallel relationship to the groves 20 and is defined by alternate upper and lower oppositely extending ridges, the lower ridges being secured as by adhesive to the recesses 22 at spaced points therealong so that the upper ridges are spaced upwardly from the surface of the recesses 22 to allow expansion and contraction of the tape between the points at which it is adhesively secured to the surface. The conductors or pick-ups normally utilized in slot cars will span a plurality of corrugations 26 to remain in constant electrical contact with the tape 24. Thus, the corrugated tape 24 may expand and contract without pulling itself from the track.

The support sections 14 abut one another in end-to-end relationship and the abutments between the support sections 14 are spaced from the abutments between the track sections 12, which is best illustrated in FIGURE 1. Each of the support sections 14 is also molded of an organic polymeric material, preferably polystyrene. Each support section 14 has a cross section including a straight portion 30 which is disposed in spaced parallel relationship to the planar portion 16 and engages the lower extremities of the U-shaped portions 20. An inclined portion 32 extends from each side of the straight portion 30 to engage the planar portion 16 at 34. A side portion 36 is integral with each inclined portion 32 and extends in coextensive engaging relationship with the adjacent side rail 18.

The support sections 14 include supports, generally indicated at 38, which are formed integrally with the support sections 14 and disposed at spaced intervals along the track. Each of the supports 38 includes a pair of surfaces 40 which meet at an apex 42. The apexes 42 are in spaced relation to the straight portion 30 and each of surfaces 40 are inclined at an angle with respect to the straight portion 30 and are in planes containing the respective inclined surfaces 32 as best illustrated in FIGURE 3. A plurality of walls 44 are integral with and interconnect the surfaces 40 and the straight portion 30. Thus, each support section 14 is an integral piece including the supports 38 and the track assembly may be supported in a banked position by placing one of the surfaces 40 on a horizontal surface for support.

The track sections 12 are preferably adhesively secured to the support sections 14 thus resulting in a structure having high strength as particularly provided by the box-like section formed about the spaces between the planar portions 16, the straight portions 30 and the U-shaped portions 20. Additional strengthening may be provided by disposing a plurality of strengthening members 50 between the planar portions 16 of the track sections and the straight portions 30 of the support sections, as best illustrated in FIGURE 4.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A slot car track assembly comprising: a plurality of track sections abutting one another in end-to-end relationship, and a plurality of support sections abutting one another in end-to-end relationship, said track sections being substantially coextensive in width and disposed in engagement with said support sections, at least portions of said track sections being spaced from said support sections to define at least one open space therebetween.

2. A slot car track assembly as set forth in claim 1 wherein said support sections include means for supporting the track on a surface so that the track is inclined at an angle to the surface thereby banking the track.

3. A slot car track assembly as set forth in claim 1 wherein each of said track sections has a cross section including a substantially planar wall portion with a plurality of U-shaped portions forming a plurality of tracks, said U-shaped portions being integral with said planar wall portion and parallel to one another, each of said support sections including a cross section having a straight portion spaced from said planar wall portion, said U-shaped portions extending from said planar wall portion with the bottoms of said U-shaped portions engaging said straight portions of said support sections.

4. A slot car track assembly as set forth in claim 3 including a corrugated conductor tape disposed on said planar portion and parallel to said U-shaped portions and having alternate upper and lower oppositely extending ridges, said lower ridges being secured to said planar portion at spaced points therealong and said upper ridges being upwardly spaced from said planar portion to allow expansion and contraction of said tape between said points.

5. A slot car track assembly as set forth in claim 3 including a rail integral with and extending along each side of said planar wall portion in parallel spaced relation to said U-shaped portions.

6. A slot car track assembly as set forth in claim 5 wherein each of said support sections includes a pair of side portions extending therealong, each of said side portions being in substantially coextensive engagement with one of said rails.

7. A slot car track assembly as set forth in claim 6 wherein each of said support sections includes an integral inclined portion disposed along each side of said straight portion, each of said inclined portions being disposed at an angle with said straight portion and integrally interconnecting said straight portion and one of said side portions.

8. A slot car track assembly as set forth in claim 7 wherein at least one of said support sections include means projecting therefrom for supporting the latter on a surface at an inclined angle relative to the surface.

9. A slot car track assembly as set forth in claim 8 wherein said means includes a plurality of supports disposed at spaced intervals along said support sections, each of said supports including a pair of surfaces meeting at an apex which is in spaced relation to said straight portion, each surface of said pair of surfaces being inclined at an angle relative to said straight portion.

10. A slot car track assembly as set forth in claim 9 wherein each of said supports includes a plurality of walls integral with and interconnecting said pair of surfaces with a straight portion, each surface of said pair of surfaces being in a plane containing one of said inclined portions.

11. A slot car track assembly as set forth in claim 10 including a plurality of strengthening members disposed between said planar portion of said track sections and said straight portion of said support sections.

12. A slot car track assembly as set forth in claim 10 wherein said track sections and said support sections are adhesively secured together.

13. A slot car track assembly as set forth in claim 10 wherein said planar portion includes a recess therein disposed along each side of each U-shaped portion, and a conductor tape disposed in each of said recesses.

14. A slot car track assembly as set forth in claim 13 wherein said conductor tape is corrugated to provide successive corrugations along the track.

15. An improved slot car track assembly comprising: a plurality of track sections abutting one another in end-to-end relationship, each of said track sections being molded of organic polymeric material and having a cross section including a substantially planar portion with an integral rail extending upwardly from each side of said planar portion, said planar portion having a plurality of spaced downwardly extending integral U-shaped portions forming a plurality of tracks which extend parallel to said rails, said planar portion including a recess along each side of each U-shaped portion, a corrugated conductor tape disposed in each of said recesses, a plurality of support sections abutting one another in en-to-end relationship, each of said support sections being molded of an organic polymeric material and having a cross section including a straight portion disposed in spaced parallel relationship to said planar portion and engaging the lower extremity of said U-shaped portions, an inclined portion extending from each side of said straight portion to engage said planar portion, and a side portion integral with each of said inclined portions and extending in coextensive engaging relationship with the adjacent side rail, said support sections having supports formed integrally therewith at spaced intervals therealong, each of said supports including a pair of surfaces meeting at an apex which is in spaced relation to said straight portion, each of said pair of surfaces being disposed at an angle with said straight portion and in a plane containing one of said inclined surfaces, a plurality of walls integral with and interconnecting said pair of surfaces and said straight portion, the abutting ends of said track sections being spaced from the abutting ends of said support sections.

16. An improved slot car track assembly comprising a surface having at least one groove therein for defining a track along said surface, a corrugated conductor tape disposed on said surface in parallel relationship to said groove and having alternate upper and lower oppositely extending ridges, said lower ridges being secured to said surface at spaced points therealong and said upper ridges being upwardly spaced from said surface to allow expansion and contraction of said tape between said points.

References Cited
UNITED STATES PATENTS

| | | | |
|---|---|---|---|
| 3,288,368 | 11/1966 | Athearn | 238—10 |
| 3,276,393 | 10/1966 | Lewis | 104—60 |
| 3,206,122 | 9/1965 | Frisbie et al. | 273—86.2 |
| 3,048,124 | 8/1962 | Lovell | 104—60 |
| 2,401,468 | 6/1946 | Duffy | 238—10 |

FOREIGN PATENTS 1,027,124   2/1953   France.

ARTHUR L. LA POINT, *Primary Examiner.*

R. A. BERTSCH, *Assistant Examiner.*